United States Patent [19]

Reenstra et al.

[11] Patent Number: 5,686,727

[45] Date of Patent: Nov. 11, 1997

[54] ULTRAVIOLET EXPOSURE DETECTION APPARATUS

[75] Inventors: Arthur Reenstra, Summerfield, N.C.; Wende Reenstra, Boston, Mass.; Thomas Belletete, Winchendon, Mass.; Curtis A. Vock, Salem, Mass.

[73] Assignee: SeeUV, Salem, Mass.

[21] Appl. No.: 534,546

[22] Filed: Sep. 27, 1995

Related U.S. Application Data

[63] Continuation-in-part of Ser. No. 314,227, Sep. 28, 1994.

[51] Int. Cl.6 ................................................ G01J 5/10
[52] U.S. Cl. .................................... 250/372; 250/227.11
[58] Field of Search ........................... 250/372 EM, 372, 250/227.31, 227.11

[56] References Cited

U.S. PATENT DOCUMENTS

| | | | |
|---|---|---|---|
| 4,428,050 | 1/1984 | Pellegrino et al. | 364/413.3 |
| 4,962,910 | 10/1990 | Shimizu | 250/372 |
| 4,985,632 | 1/1991 | Bianco et al. | 250/372 |
| 5,008,548 | 4/1991 | Gat | 250/372 |
| 5,331,168 | 7/1994 | Beaubien et al. | 250/372 |

FOREIGN PATENT DOCUMENTS

| | | | |
|---|---|---|---|
| 62-54128 | 3/1987 | Japan | 250/372 |
| 64-18028 | 1/1989 | Japan | 250/372 EM |
| 1753302 | 8/1992 | U.S.S.R. | 250/227.11 |

OTHER PUBLICATIONS

Hoyt S. Scott, "Measurements of Erythemal Energy." *AIEE Technical Paper 49–186* (Jul. 1949) title page and pp. 1–9.
Newsweek Clipping (May 1995) of SunCast UV Monitor [No Weekly date or page number known].

*Primary Examiner*—Constantine Hannaher
*Attorney, Agent, or Firm*—Curtis A. Vock

[57] ABSTRACT

An ultraviolet radiation detection exposure system determines either ultraviolet flux or accumulated ultraviolet energy. A detector converts the ultraviolet radiation into voltage, and a voltage-to-frequency converter provides a corresponding frequency. If the system measures flux, a conversion subsystem converts the frequency to an associated ultraviolet flux in watts. If the sensor measures ultraviolet energy over a period of time, a counter counts at the frequency of the voltage-to-frequency converter thereby integrating the received ultraviolet energy at the detector. A reset button allows the user to reset the system, clearing the counter, prior to entering the sun for the day. A warning light, display, or buzzer indicates to the user of the system that her skin is in danger of receiving a sun burn. A plurality of fibers and/or lambertian half-spheres are used to provide substantially uniform solar acceptance. A solar cell can be used to power the apparatus, especially within a watch configuration.

7 Claims, 11 Drawing Sheets

ULTRAVIOLET EXPOSURE DETECTION APPARATUS

RELATED APPLICATIONS

This is a continuation-in-part of U.S. application Ser. No. 08/314,227, filed on Sep. 28, 1994, and which is expressly incorporated herein by reference.

FIELD OF THE INVENTION

The invention relates generally to the measurement of ultraviolet radiation; and particularly to the detection and early warning of over-exposure to ultraviolet radiation.

BACKGROUND OF THE INVENTION

The dangers of ultraviolet (UV) radiation are well understood. For example, it is well known that exposure to sunlight can result in a sun burn. Although this is a common occurrence, sun burns can lead to skin cancer and ultimately death.

The degree of a sun burn depends to some extent upon an individual's skin type. Those individuals with fair skin, for example, generally burn easier than those individuals with dark complexions. Other factors also influence a person's susceptibility to sun burn, such as altitude and the blocking power of an applied sun screen lotion.

Nevertheless, all individuals risk sun burn after a certain exposure to ultraviolet radiation. Most individuals are unaware of the daily amount of UV exposure they receive; and typically seek shelter, or "cover up", only after noticing the sun burn.

Sensors for measuring ultraviolet energy are known. Such sensors could be used by those concerned individuals to gauge their exposure to ultraviolet solar radiation. However, accurate sensors are typically expensive and/or bulky to carry around by the ordinary individual.

It is, accordingly, an object of the invention to provide a compact ultraviolet sensor which is easily carried by an individual.

Another object of the invention is to provide an ultraviolet sensor which warns an individual when a preselected exposure to ultraviolet energy has been reached.

These and other objects of the invention will become apparent in the description which follows.

SUMMARY OF THE INVENTION

The invention provides, in one aspect, a system for determining an individual's accumulated exposure to ultraviolet radiation. A detector senses ultraviolet radiation and produces a voltage proportionate to the radiation. A voltage-to-frequency converter converts the voltage to a corresponding frequency, and a counter counts at the frequency. An indication module, e.g., a LCD display, a LED or piezoelectric buzzer, communicates to a user of the system that the counter has reached a particular preselected value. This value is representative of accumulated UV exposure.

A reset switch resets the counter to a zero value so that a user can initialize the system selectively.

Preferably, the system includes a wrist-watch such that the detector, converter, counter and associated interconnections are arranged substantially within the wrist-watch. The indication module, e.g., a LCD display, remains visible to a wearer of the wrist-watch so that she is aware of the exposure level. A typical watch battery provides the energy for the watch and for the detector, counter, and converter.

In a preferred aspect, the watch includes a LCD display and a toggle button. This display provides the time-of-day; and further provides a value of accumulated UV exposure when the toggle button is pressed.

In other aspects, the indication module includes a LCD display, and the system includes a conversion subsystem to convert a count value into UV energy. That is, the conversion module calibrates information from the counter into actual UV energy, e.g., ergs or joules; and the display communicates this actual energy to the user.

In yet another aspect, a filter is included to selectively alter the spectrum of the ultraviolet radiation incident upon the detector. In addition, since the detector has its own spectral response characterization, such a filter can compensate for this spectral response characterization selectively.

The invention also provides, in another aspect, a system for determining ultraviolet radiation flux. As above, a detector senses ultraviolet radiation and produces a voltage proportionate to the radiation. A voltage-to-frequency converter converts the voltage to a corresponding frequency, and an indication module communicates a value corresponding to the frequency to a user of the system. In this manner, a user of the system receives UV flux information, e.g., watts, as opposed to UV exposure, or integrated UV energy.

Such a system in this aspect thus preferably includes a conversion module for converting the frequency into watts.

The invention also provides a method for determining ultraviolet radiation exposure and for communicating that exposure to an individual, including the steps of: (i) sensing ultraviolet radiation and producing a voltage proportionate to the radiation; (ii) converting the voltage to a corresponding frequency; (iii) counting at the frequency; and (iv) communicating at least an indication of a value counted to the individual.

In other aspects, the method includes the steps of storing a count from one day and continue counting from that stored count on a following day. The method also preferably includes the step of warning the individual when the counted-to value reaches a preselected level.

The invention can also include one or more lambertian-like half-spheres, each of the half-spheres providing a more uniform solar acceptance to solar energy impinging onto the detector. Further, a plurality of UV-transmitting fibers can be used with the half-spheres, each of the fibers relaying energy scattered from within the half-sphere to the detector.

In another aspect, the invention provides a plurality of UV-transmitting fibers, the fibers arranged to receive solar radiation at differing angles relative to a surface normal of the detector, the fibers providing a more uniform solar acceptance to solar energy impinging onto the apparatus.

In yet another aspect, the invention includes a wrist-watch, where the detector, energy-to-frequency converter, counter and indicator are arranged substantially within the wrist-watch such that the indicator is visible to a wearer of said wrist-watch along a viewing axis. A plurality of UV-transmitting fibers are arranged to receive solar radiation at differing angles relative to the viewing axis, whereby the fibers provide a more uniform solar acceptance to solar energy impinging onto the apparatus.

In a preferred aspect, a solar cell is used and connected to view the ultraviolet radiation and to power the apparatus.

The invention is next described further in connection with preferred embodiments, and it will be apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF ILLUSTRATED EMBODIMENTS

Figure 1:
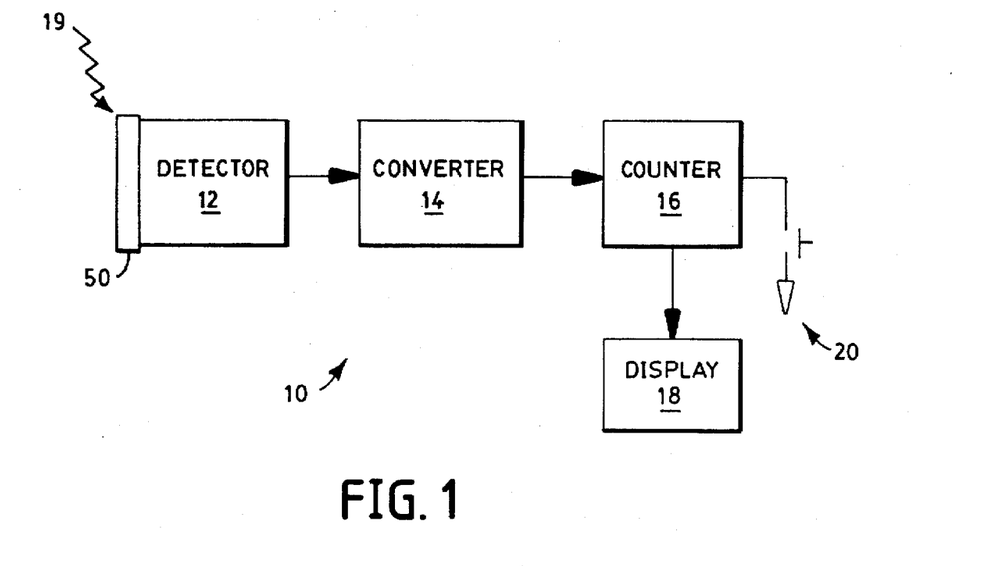
FIG. 1 shows a schematic view of a sun exposure detection system constructed according to the invention.

FIG. 1 illustrates a sun exposure detection system 10 constructed according to the invention. The system 10 includes a detector sensor 12, a voltage-to-frequency converter 14, a counter 16, and a display 18. A push-button reset 20 is used to reset the system 10.

The system 10 operates to inform a user about her accumulated exposure to ultraviolet radiation 19. The detector 12 senses and converts ultraviolet radiation to voltage, and communicates that voltage to the voltage-to-frequency converter 14. The converter 14 connects to the counter 16 which counts at the frequency indicated by the converter 14. Accordingly, the counter 16 integrates the amount of energy 19 received at the detector 12 over a period of time.

This period of time is initiated by the user of the system 10. The user resets the reset button 20 each time she goes into the sun. This resets the counter to zero so that a running total of accumulated ultraviolet energy 19 may be determined. The user monitors the display 18 from time-to-time to assess whether she has been exposed to an excessive amount of ultraviolet energy 19.

In the preferred embodiment of the invention, the display 18 includes a conversion subsystem to convert a count value from the counter 16 to an actual accumulated UV exposure energy, e.g., in ergs or joules, which is then shown on the display 18. Such a conversion subsystem should be calibrated in order to provide the correct UV energy for a particular count value.

The particular value on the display 18 that a user associates with "excessive" UV exposure is determined by experimentation. For example, once a user goes into the sun and receives a sun burn, that user knows, by looking at the display 18, what amount of ultraviolet energy causes a sun-burn for his or her skin type. That user thereafter knows to leave the sun, or to cover-up, when the display 18 shows a value which approaches their critical UV exposure amount.

Figure 1A:
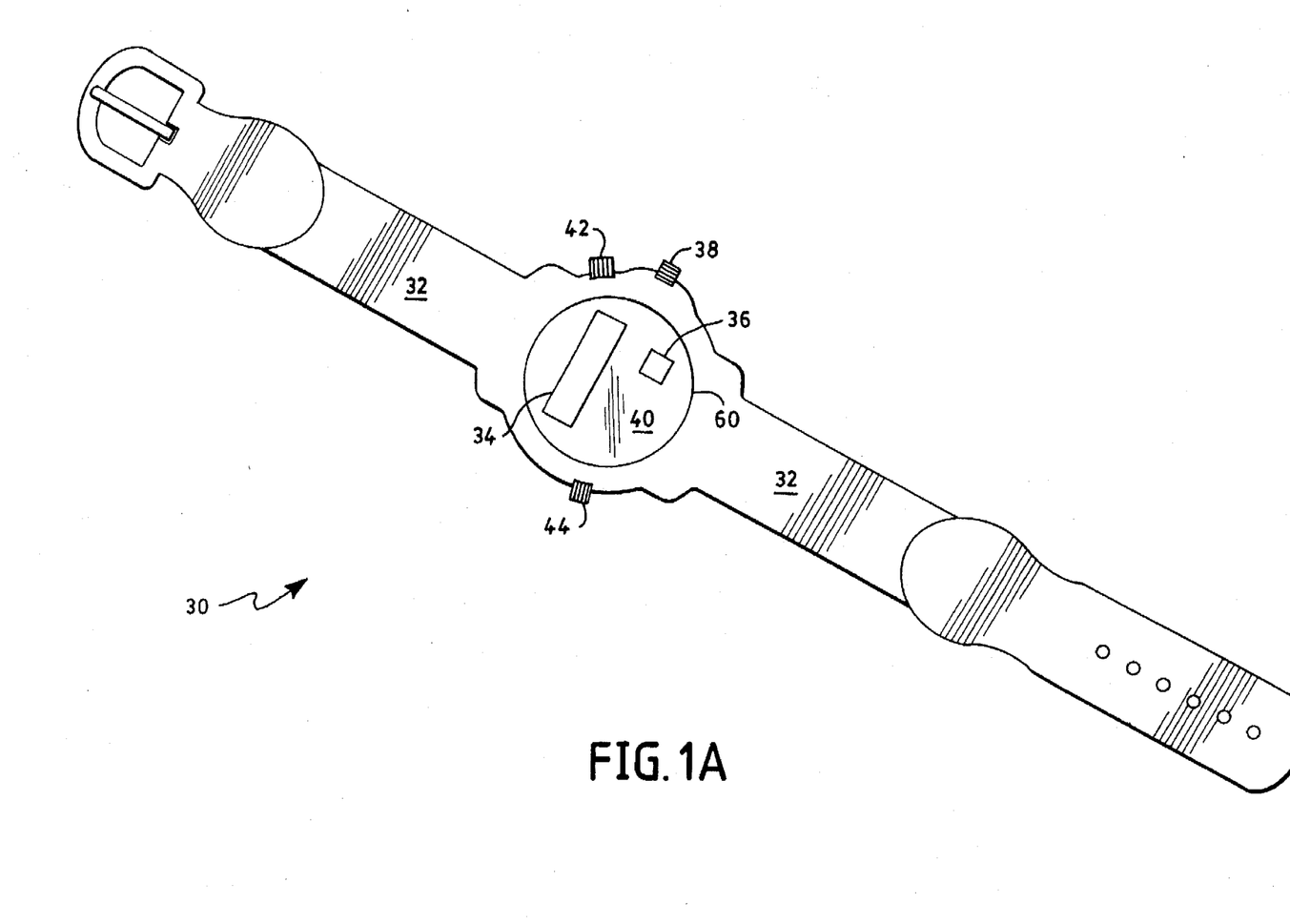
FIG. 1A illustrates a wrist-watch according to the invention which incorporates the system of FIG. 1.

In accord with the invention, the system 10 is preferably incorporated into a watch and attached to the user's wrist in the normal way. FIG. 1A shows such a watch 30. The watch 30 is like other watches in that it has a wrist band 32, a digital time read-out display 34, a calendar 36, and a clock/calendar adjustment knob 38. System 10 of FIG. 1 is incorporated within the watch section 40, and is selectively operable by the user by pressing the UV read-out button 42. The display 34 thus provides the time of day, or, alternatively, the read-out of accumulated ultraviolet exposure when the user toggles the button 42. A reset button 44 operates as the reset button 20 of FIG. 1 to initiate the integration of UV energy when the user enters the sunlight for the first time during a particular day.

Those skilled in the art will appreciate that other features may be incorporated into the watch 30, such as a night light, pressure gauge, and waterproofing. Further, and without limitation, the knob 38 can incorporate the features of the button 42 and/or button 44 as a matter of design choice.

Figure 2A:
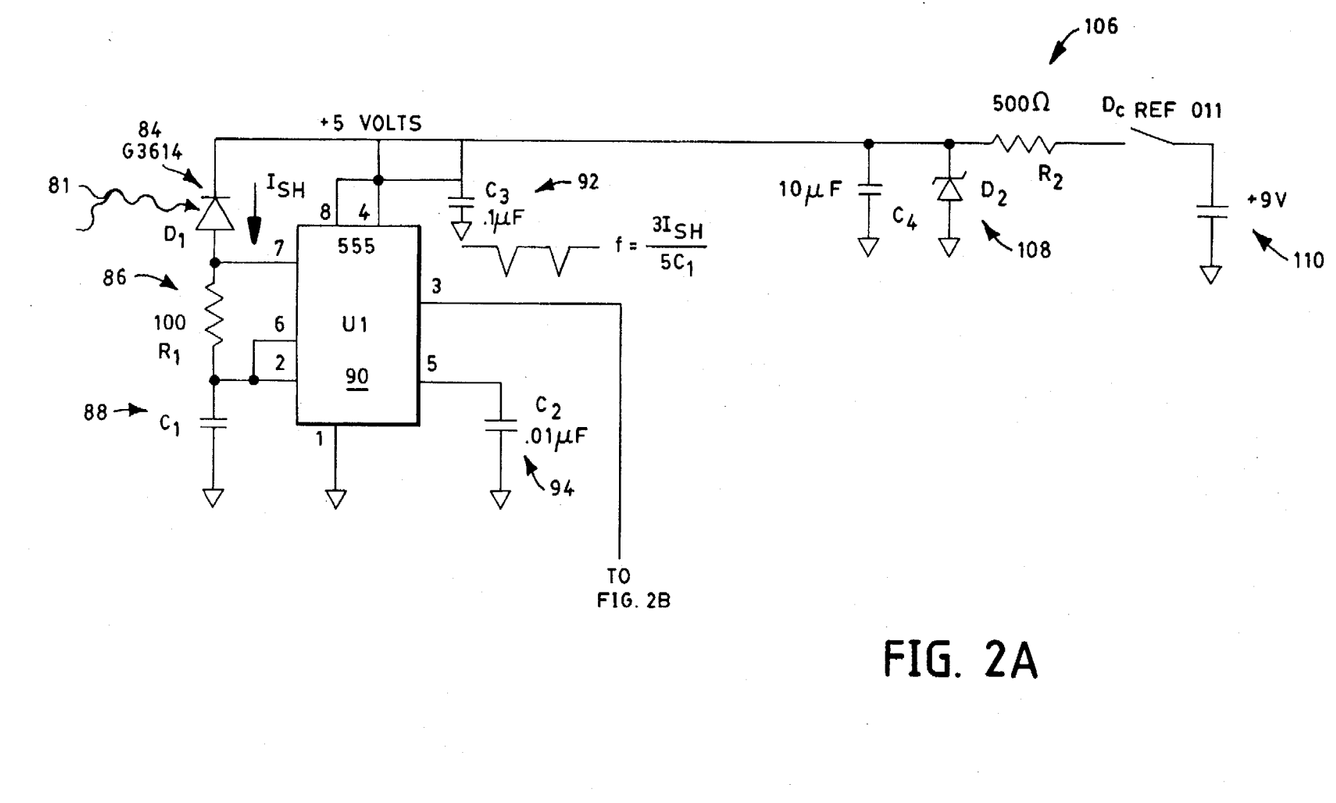
FIG. 2 shows a schematic diagram of a sun exposure detection circuit suitable for use in the system of FIG. 1.
Figure 2B:
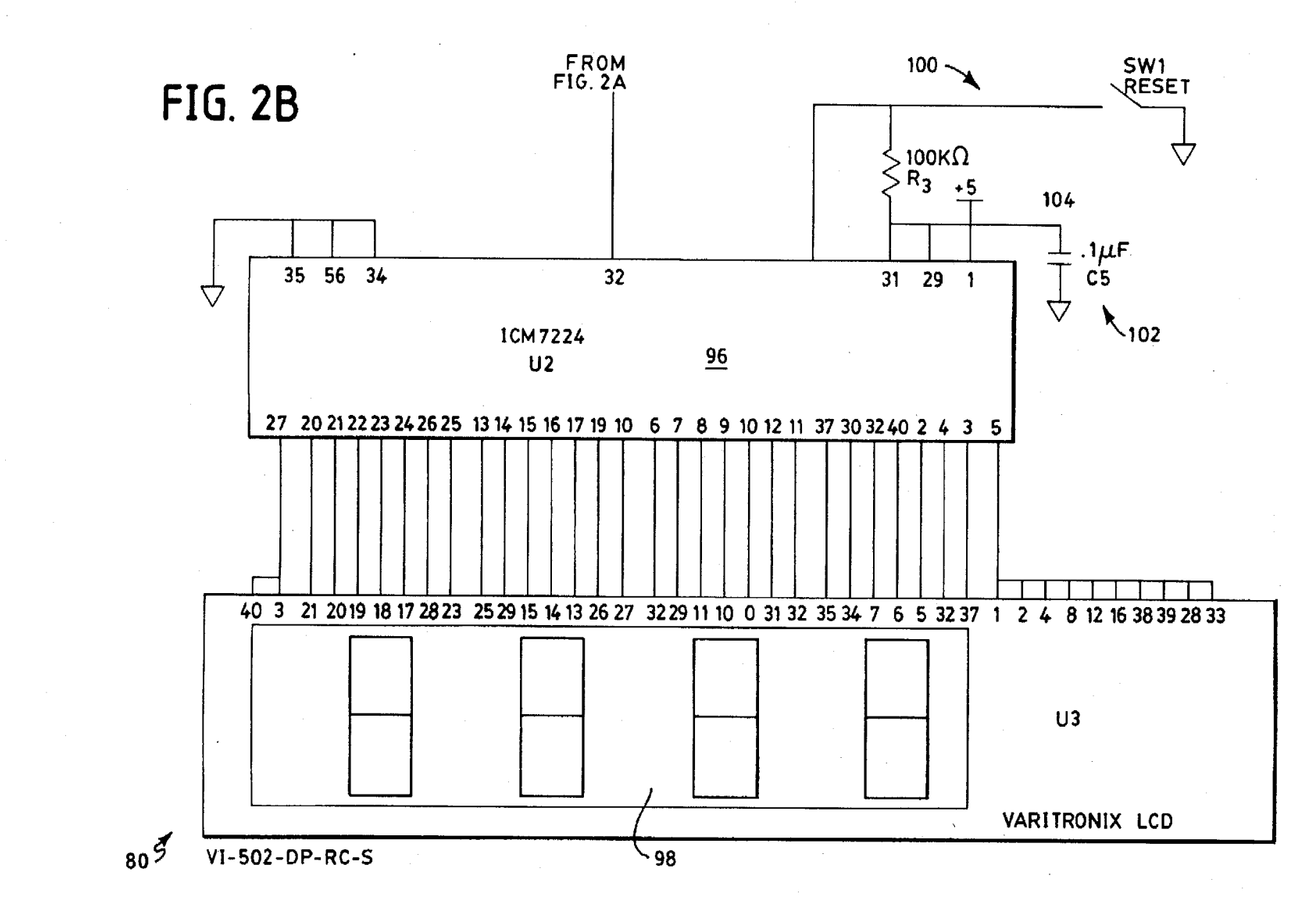

The system 10 of FIG. 1 fits within the dimensions of the typical wrist-watch section 40. The detector sensor 12 is a solid state device such as the Hamamatsu G3614-01 semiconductor UV sensor. The converter 14 is, likewise, a solid state device such as the 555 microchip. The counter 16 is, for example, the ICM7224 microchip. The display 18 of FIG. 1, or the display 34 of FIG. 2, is preferably a commonly available liquid crystal display (LCD). A small battery (not shown) provides the power for the watch 30; or a solar power cell may alternatively provide some or all of the energy for the system 10.

The detector 12, FIG. 1, preferably responds to the ultraviolet radiation which induces sun burn, for example, in the wavelength range of 250 to 400 nanometers. However, it may be desirable in some instances to filter certain parts of this UV spectrum to more closely represent the response characteristics of the human skin. Therefore, FIG. 1 shows a UV filter 50 which can be used in certain aspects of the invention to modify the UV spectrum integrated by the system 10. In addition, the filter 50 can be used to compensate for the detector response characteristics to effectively null the non-linear spectral response characteristics of the detector 12.

Accordingly, a filter 50 may be incorporated into the watch face 60 of FIG. 1A. Such a filter is developed by applying a multi-layer UV coating onto a visible and UV transmitting substrate, e.g., glass, that forms the watch face 60.

Figure 1B:
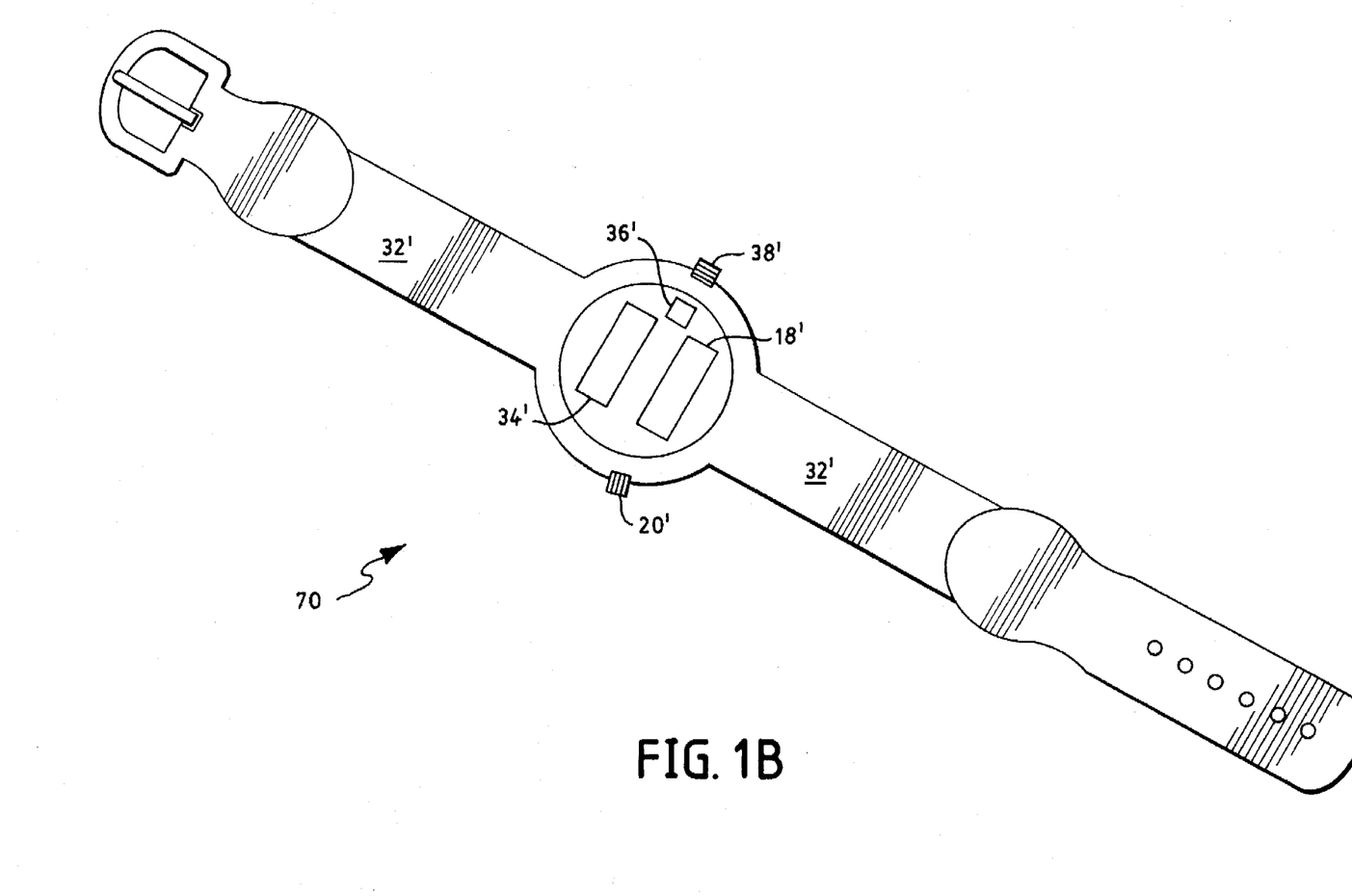
FIG. 1B illustrates a wrist-watch according to the invention which incorporates the system of FIG. 1.

FIG. 1B shows an alternative watch 70 in accord with the invention. As before, the watch 70 has a band 32', a calendar read-out 36', and a time/calendar adjustment knob 38'. However, the time-read out display 34' is separate and distinct from the display 18' which indicates accumulated UV exposure. The reset button 20' is pressed by the user prior to sun exposure to begin the integration of UV energy. In the illustrated embodiment of FIG. 1B, the accumulated UV exposure is always conveniently displayed.

One advantage of the invention is that it draws almost negligible power. The sensor 12 of FIG. 1 provides its own power through the conversion of solar energy into a signal. The rest of the components—14, 16 and 18 of FIG. 1—are easily connected as integrated circuits to within the circuitry of existing digital watches. Therefore, the invention provides practically no power drain; and when used within a watch, the battery life is not significantly diminished by incorporating the invention together with normal and prior art watch features, such as a calculator, display lights, and the digital display.

FIG. 2 illustrates one preferred embodiment of an electrical circuit 80 suitable for constructing the system 10 of FIG. 1. The circuit 80 integrates ultraviolet radiation 81 over time and displays the total UV energy on the display 98. The UV sensing detector 84 is the Hamamatsu G3614-01 ultra-small UV GaAsP photodiode sensor chip with an integrated UV filter, e.g., the filter 50 of FIG. 1. With the filter, the detector 84 has a non-zero response between 260 and 320 nanometers which is converted into a proportional current at a rate of 10 mA/watt at the peak wavelength of 290 nanometers. This current passes through resistor 86 and charges capacitor 88 at a rate that is determined by the current from the photodiode detector 84.

When the voltage across capacitor 88 reaches a certain threshold, the output of the voltage-to-frequency converter microchip 90 is pulsed low. The microchip 90 will internally discharge capacitor 88 through resistor 86 and then release the capacitor 88 so that it can be recharged by the detector 84. Resistor 86 is relatively small so that the pulse width remains narrow.

The output frequency of the converter microchip 90 is approximately 0.6*Idiode/C1, where Idiode is the current from the detector 84 and where C1 is the value of the capacitor 88. The value of C1 is chosen to yield the desired sensitivity of the system 80.

Capacitor 92 is a power supply bypass to reduce noise; and capacitor 94 stabilizes the internal threshold of the converter microchip 90. The output pulse train from the converter microchip 90 is attached to the count input of the counter microchip 96, which is the ICM87224.

The counter microchip 96 is a 4.5 digit LCD counter display chip which includes an internal counter and the logic required to drive the LCD display 98, which is the Varitronix VI-502-DP-RC-S. The outputs of the display driver portion of the counter microchip 96 are tied directly to the 4.5 digit LCD display 98.

An external reset switch 100, e.g., similar to the reset button 20 of FIG. 1, is provided to reset the internal counters of the counter microchip 96. Momentarily depressing the switch 100 will pull the reset input low and clear the counters of the counter microchip 96 and blank the display 98. Once the switch 100 is released, the counter microchip 96 will begin to accumulate, i.e., "count", the total exposure to the ultraviolet radiation within the pass-band of the detector 84.

Capacitor 102 is a power supply bypass cap to reduce noise; and resistor 104 is a pull-up resistor for the reset line. Resistor 106 and a five volt zener diode 108 are included to generate a positive five volt supply from a nine volt battery 110. Capacitor 112 further stabilizes the five volt line.

Those skilled in the art will appreciate that the circuit 80 illustrated in FIG. 2 is also constructed as a single semiconductor element, e.g., a custom integrated circuit. Further, those in the art can appreciate that other commercial solid state devices can be used to replace one or more of the illustrated microchips 90, 96, 98 without departing from the scope of the invention; and that the associated interconnections change to accommodate the replacement(s).

Figure 3A:
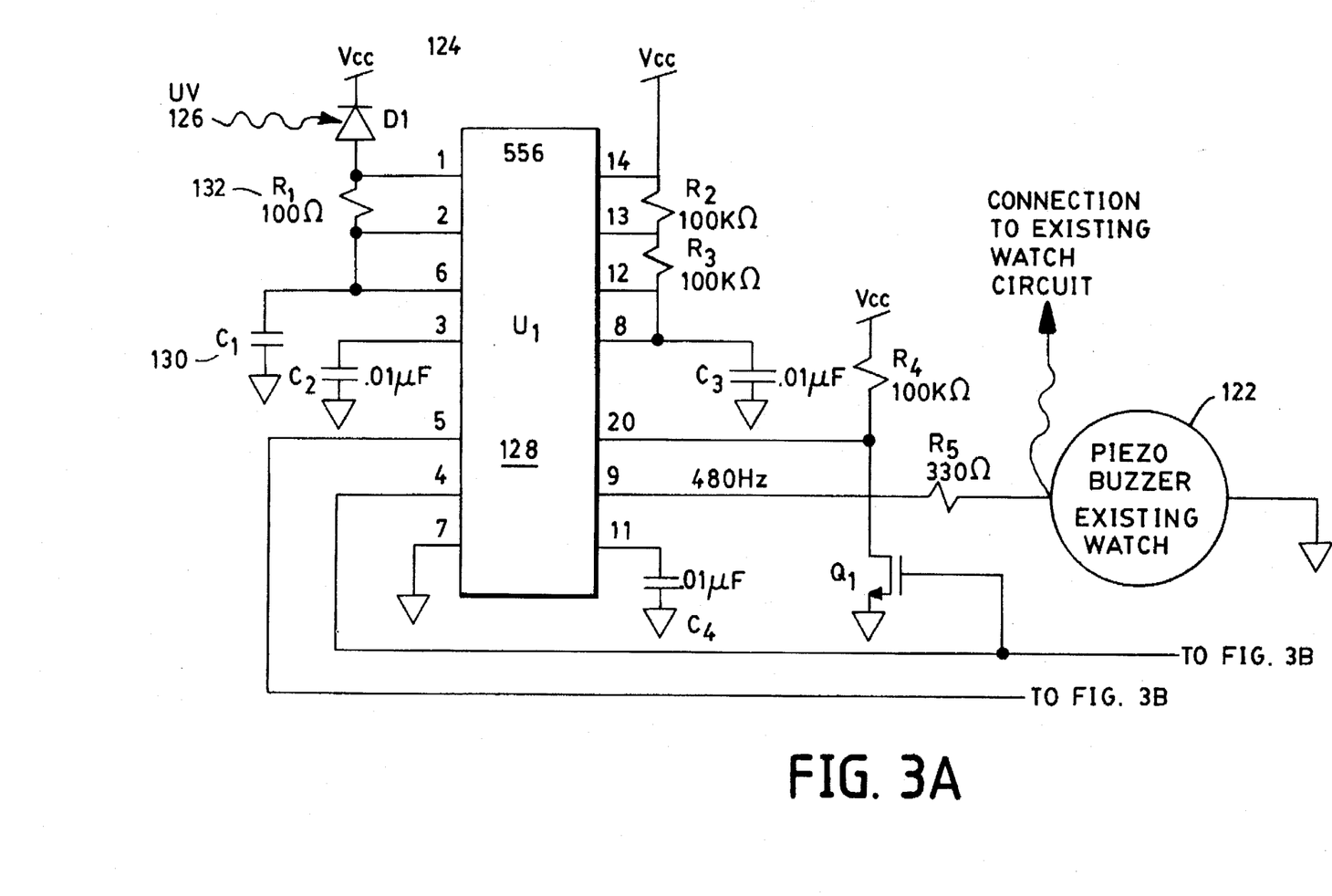
FIG. 3 shows a schematic diagram of an alternative sun exposure detection circuit suitable for use in the system of FIG. 1.
Figure 3B:
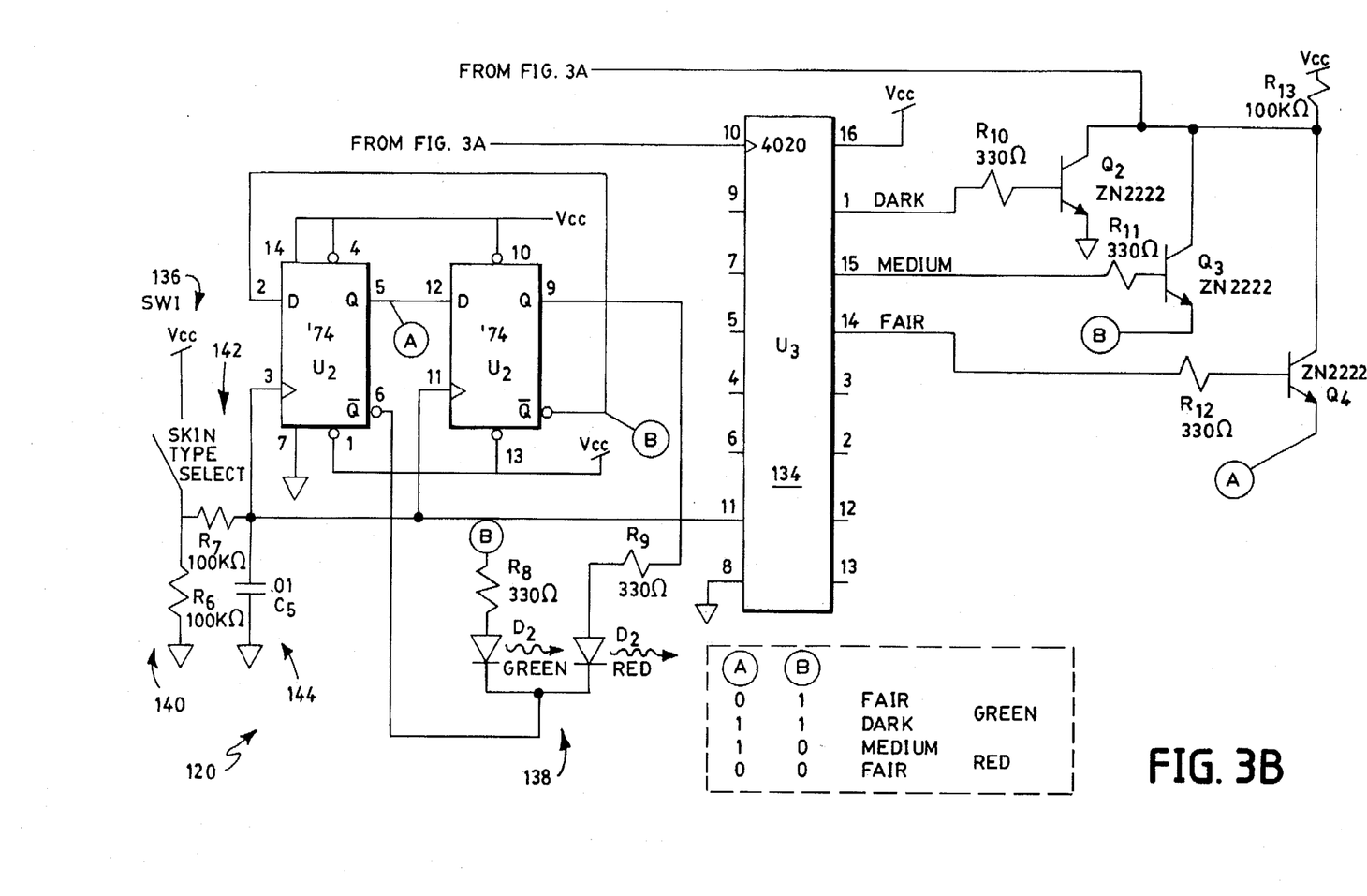

FIG. 3 shows a circuit 120 constructed according to the invention. Such a circuit 120 is similar to the circuit 80 of FIG. 2, but, for example, does not include a display 98. The circuit 120 also provides three settings for skin type and an audible alarm 122 which warns the user that a preselected exposure limit is attained.

As above, circuit 120 is preferably incorporated into a watch such as shown in FIG. 1A. Other features such as a stop watch and time alarm may be included as a matter of design choice.

Circuit 120 utilizes the Hammamatsu G3614-01 UV sensor 124 with an integrated UV filter (not shown), which transmits UV radiation 126 within the range 260 to 320 nanometers. This UV radiation 126 is converted to a proportional current which charges capacitor 130 through resistor 132, and which is converted to a proportional frequency by the current-to-frequency converter 128, here shown as the LM556. The pin5 output of the converter microchip 128 is a pulse train which drives a CMOS 14 stage counter microchip 134.

The converter microchip 128 is also used to establish an astable oscillator with a frequency of 480 Hz. The oscillator is held reset until the selected safe exposure limit is reached, sounding the piezoelectric buzzer 122. The skin type selection is done by momentarily depressing reset switch 136; and repeatedly depressing the switch 136 to cycle through the preselected skin type settings. The selected level of exposure is indicated by a two-color LED 138: green indicates dark skin complexion, red indicates average skin complexion, and no illumination indicates fair skin.

Resistors 140, 142 in combination with capacitor 144 act to debounce the input switch 136. Setting the skin type also resets the integration counter 134 to zero. The fourteen stage counter 134 will count the number of pulses from the current-to-frequency converter microchip 128 until the selected skin type counter value is met. At this point, either FET 146, 148, or 150 will turn on and disable further counting by the counter microchip 134. FET 146 acts as an inverter and releases the 480 Hz buzzer driver signal. The buzzer 122 will sound until the reset switch 136 is pushed.

The Capacitor 130, together with appropriate counter taps, are adjusted to modify the skin type settings.

Those skilled in the art can appreciate that the illustrated components within circuit 120 are preferably replaced with surface mount packaging. Such packaging permits a form-factor such as a watch configuration of FIGS. 1A and 1B.

Further, those skilled in the art will appreciate that other warning sensors can replace the piezoelectric buzzer 122. For example, a tactile sensor or a visual light emitting diode (LED) can also be used in place of the piezoelectric buzzer 122 to warn the user of the system that a skin exposure level has been reached.

Figure 4:
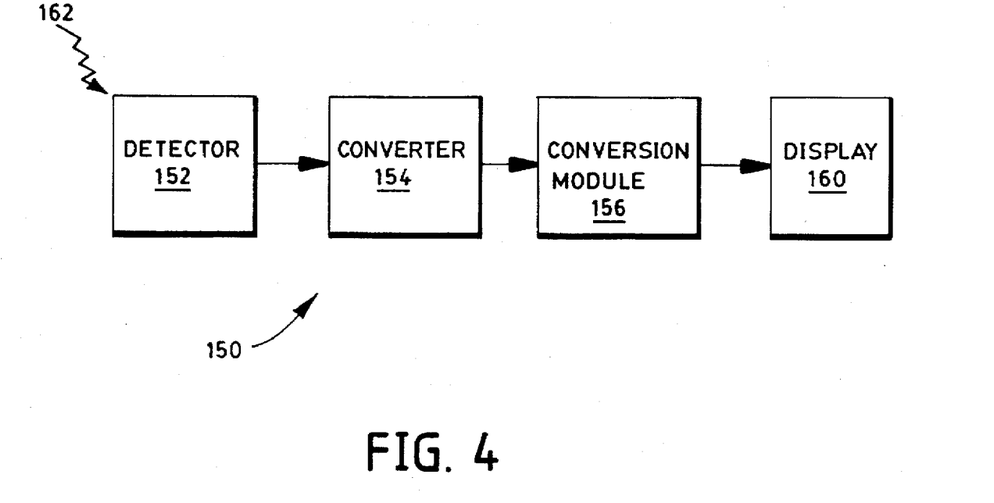
FIG. 4 shows a schematic view of a UV measurement system constructed according to the invention.

FIG. 4 illustrates a UV radiation measurement system 150 constructed according to the invention. As in FIG. 1, system 150 includes a UV detector sensor 152 which detects UV radiation and which converts that radiation into a proportional voltage. The voltage-to-frequency converter 154 converts the proportional voltage into a frequency that is indicative of the UV radiation flux, or watts, within the detector pass-band. A conversion module 156 converts the frequency of the voltage-to-frequency converter to a calibrated value of actual watts for display on the display 160. In this manner, incident UV radiation within the detector pass-band is measured at a given moment in time, rather than integrated over time as in system 10 of FIG. 1.

This is beneficial for several reasons. By including a known narrowband filter with the detector sensor 152, a measurable flux incident upon the system 150 is known in the selected passband of that filter. Another filter is then used to measure yet another spectral band. Multiple systems 150 may be operated together to provide a scientific UV measuring instrument over a broad spectrum. Alternatively, the detector 152 is selected with a broad UV passband; and differing filters passed in front of the detector 152 to provide the flux measurements over the broader spectrum.

Figure 5:
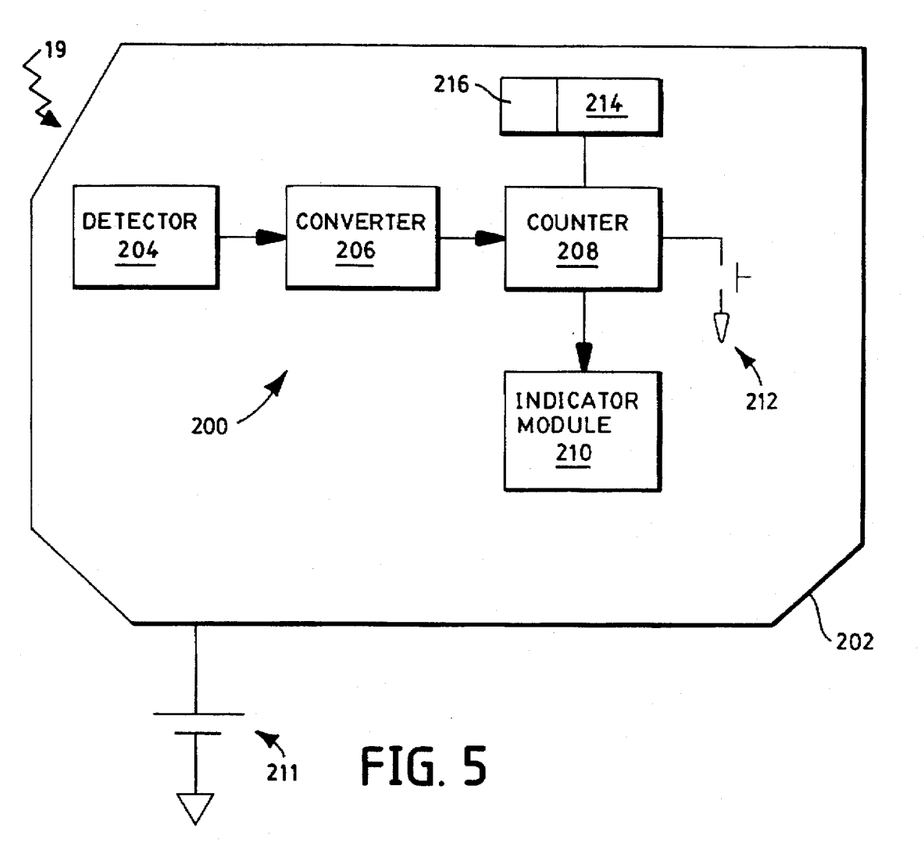
FIG. 5 shows a schematic view of an alternative sun exposure detection system constructed according to the invention.

FIG. 5 illustrates a system 200 constructed according to the invention. Like the system 10 of FIG. 1, system 200 is arranged within a wrist-watch, here shown as outline 202. A detector 204 detects and converts UV radiation into a proportional voltage. This voltage is converted to a proportional frequency by the voltage-to-frequency converter 206. A counter 208 counts at the frequency of the converter 206 and an indication module 210 provides an indication of a value of the counter 208; and a battery 211 provides energy to the system 200. For example, the indication module is preferably a LCD display, although a LED or piezoelectric warning mechanism is also appropriate according to the invention.

A reset switch 212 provides a user of the system with a mechanism (i) to reset the counter 208, or, alternatively, (ii) to continue integrating UV radiation from a previous day. A memory module 214 connects to the counter 208 and stores a daily value from the counter 208 until at least two days after an initial large exposure to UV radiation. A computational module 216 determines whether the accumulated UV energy from the past two days approaches to within 50% of an individual's preselected skin UV exposure limit. If the value is near to the limit, a small compensation is made to the value and the compensated value is initiated at the counter 208 at the start of the following day. In this manner, a user who receives a relatively large dose of sunlight in one day—but is not burned—will be warned about the possibility of burn earlier in the following day because the counter 208 starts with a non-zero value.

In operation, a user on a first day enters the sun, presses the switch 212, and the watch 202 accumulates UV energy. Provided that a preselected maximum daily exposure value is not reached—i.e., provided that the counter 208 does not reach a value corresponding to a preselected exposure setting within the system 200—the memory 214 and computational module 216 operate to store the value until the following day. This is facilitated by a user pressing the switch 212 to deactivate the counter 288. Alternatively, the system 200 keeps integrating UV energy through the night. In either event, when the user next presses the switch at the beginning of the following day, the module 216 warns the user via the indication module 210 that she is near to the exposure limit. If a user then does nothing, the watch 202 tacks on additional UV energy for the current day onto the stored values from the previous day. Alternatively, the user resets the counter 208 by pressing the switch 212, thereby starting anew.

Figure 6:
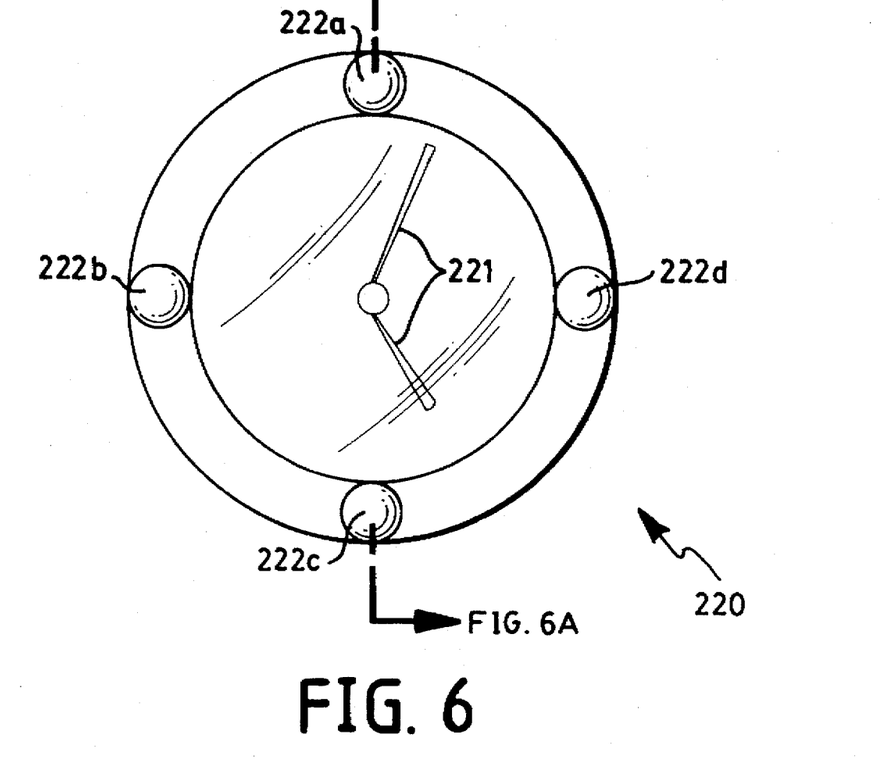
FIG. 6 illustrates a watch face, constructed according to the invention, which includes lambertian-like half-spheres to provide a substantially uniform solar acceptance for differing angles to the sun.

FIG. 6 illustrates a watch face 220 constructed according to the invention. The watch hands 221 and cover 221a are shown for illustrative purposes only. Specifically, the face 220 includes a plurality of lambertian-like half spheres 222a, 222b, 222c, 222d mounted to the watch face 220. These lambertian-like half spheres provide a more uniform acceptance to solar energy impinging on the watch face 220.

The operation of the spheres is better understood with reference to FIG. 1. In FIG. 1, the radiation 19 appears to have a decreased signal strength depending upon the angle of incidence, relative to the surface normal, onto the filter 50 (or equivalently onto the detector 12). This decreased energy is well understood to be caused by two separate phenomenon: first, the apparent area of the detector element's active surface decreases away from the surface normal, causing a cosine fall-off in energy; and second, the detector surface is less sensitive to photons striking the surface from off-normal angles.

The net effect of these phenomena is to decrease the sensitivity of the system 10 for off-normal solar angles. Therefore, and with reference to FIG. 1A, when the watch 30 is not angled directly at the sun, there is a reduced signal strength recognized by the system 10, causing a loss of sensitivity and accuracy.

The addition of the half-spheres 222 of FIG. 6 reduces these problems by providing an angled acceptance to solar energy. A "lambertian" surface is by definition one which appears to exhibit uniform radiance from any viewing angle. An approximate lambertian half-sphere can be made from UV-transmitting glass formed into a sphere. The glass of the sphere is ground so that the surface is randomly rough in comparison to UV wavelengths; and then the sphere is cut in half. Thus, when solar energy hits the half sphere, from any angle, the UV solar energy scatters to within the sphere and that energy is picked up by the detector, such as described below.

Figure 6A:
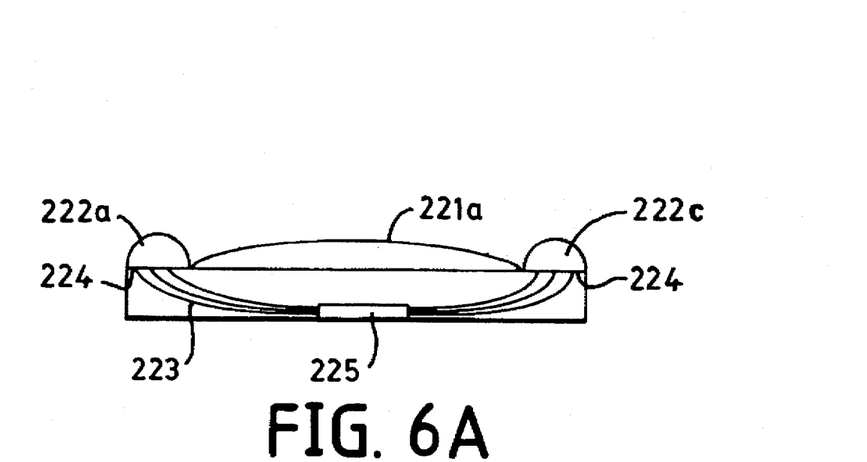
FIG. 6A shows a cross-sectional of the watch of FIG. 6.

FIG. 6A is a cross-sectional view of the watch face 220 and shows the half spheres 222a and 222c in an axis perpendicular to the one illustrated in FIG. 6. Each of the spheres 222 have a plurality of UV-transmitting fibers 223 connected to the flat portion 224 of the sphere; and these fibers 223 relay the energy scattered from within the sphere to the UV detector 225, e.g., similar to the detector 12 of FIG. 1. In this manner, the watch face 220 provides a more uniform acceptance signal for UV energy striking the watch from the variety of positions from which the user my place the watch relative to the sun. For illustrative purposes, the remainder of the system 10 of FIG. 1 is not shown in FIGS. 6 and 6A.

Those skilled in the art will understand that the watch face 220 can operate without the detector 225 when the detector is placed directly under one of the half-spheres 222. The purpose of the fibers 223 is to spatially relay the energy from the half-sphere 222 to the detector. Further, a plurality of detectors can be placed under each half-sphere, or a single half-sphere and detector can be used. In either case, the combination of a half-sphere and detector provides a more uniform solar acceptance, and hence sensitivity, to UV light.

The spheres 222a and 222c of FIG. 6A have an acceptance area equal to one-half that of the spheres of FIG. 6, since the spheres appear circular in FIG. 6 and they appear half-spherical in FIG. 6A. Accordingly, there will be an energy fall off when the sun views the watch 220 from the side, such as shown in FIG. 6A. The other two spheres, 222b, 222d also provide input to the UV detector 224, and their combined acceptance is approximately equal to one-half that of the acceptance of the spheres in a top view, such as in FIG. 6. Therefore, the spheres 222 of FIGS. 6, 6A are preferably coated or otherwise masked to reduce the UV transmission directly at the top of the sphere, such as illustrated in FIGS. 8 and 8A.

Figure 8:
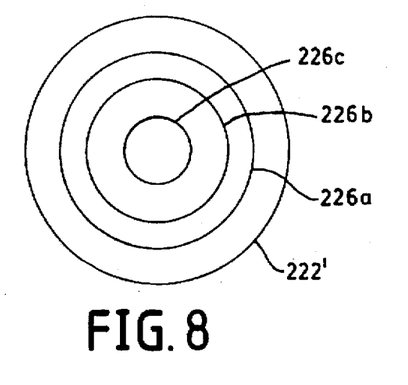
FIG. 8 shows one lambertian half-sphere constructed according to the invention and which is modified to alter the transmission of UV light as a function of angle to the half-sphere.
Figure 8A:
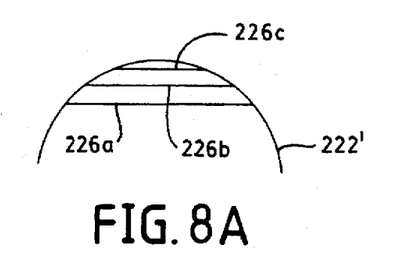
FIG. 8A shows a side-view of the half-sphere of FIG. 8.

In FIG. 8, one half-sphere 222' is illustrated with a plurality of concentric coatings or masks 226a, 226b, and 226c. FIG. 8A illustrates a side view of the half-sphere of FIG. 8. The purpose of these coatings is to modify the acceptance characteristics of the energy scattered to within the sphere—and hence detected by the detector—so that the transmitted energy is approximately equal regardless of whether the sun directly illuminates the top of the sphere—such as in FIG. 8—or the side of the half-sphere, such as in FIG. 8A. In this manner, a more uniform solar acceptance is achieved.

Figure 7:
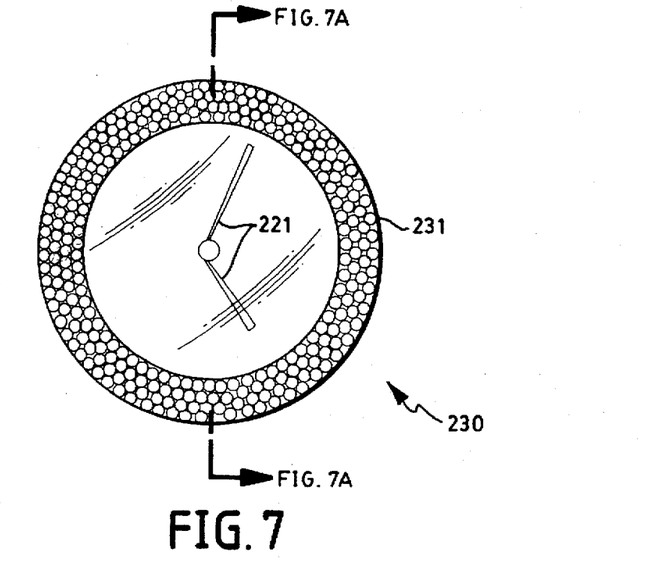
FIG. 7 illustrates another watch face, constructed according to the invention, which includes a plurality of UV-transmitting fibers to provide a substantially uniform solar acceptance for differing angles to the sun.

FIG. 7 shows an watch face 230 illustrating an alternative embodiment of the invention. Again, the watch hands 221 and cover 221a are shown for illustrative purposes only. In FIG. 7, the half-spheres shown in FIG. 6 are removed and a plurality of UV-transmitting fibers 231 are arranged around the watch rim 232 so that UV energy is picked up from a variety of incidence angles, relative to the surface normal to the watch face.

Figure 7A:
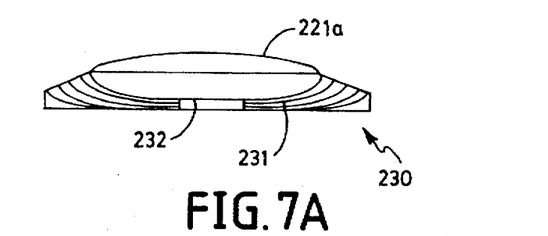
FIG. 7A shows a cross-sectional view of the watch face of FIG. 7.

FIG. 7A shows a cross-sectional view of the face 230. Each of the fibers 231 connect to the UV detector 232, e.g., the detector 12 of FIG. 1. A filter (not illustrated) can be placed between the fibers 231 and the detector 232.

Figure 7B:
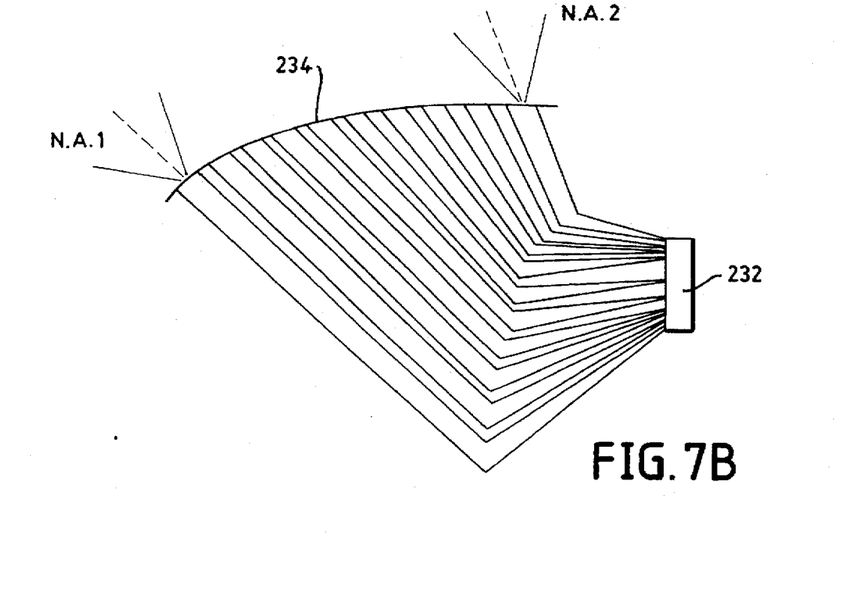
FIG. 7B illustrates a close-up and cross-sectional view of one portion of the watch of FIG. 7 and which includes a plurality of UV fibers connected to a UV sensor.

As above, the watch face 230 provides a more uniform acceptance and sensitivity to UV radiation impinging on the watch 230. FIG. 7B schematically illustrates one portion 234 of the watch 230 where a plurality of fibers 231 are arranged to view a wider field of view than a single fiber can. For example, the numerical aperture of fiber 231a (denoted as N.A.1) is directed to achieve a field of view that is different than the numerical aperture of fiber 231b (denoted as N.A.2). The combined acceptance field of view of the fibers 231a, 231b is greater than either fiber alone. Accordingly, in combination with all of the fibers 231, a wide angle acceptance to the sun is achieved.

Figure 9:
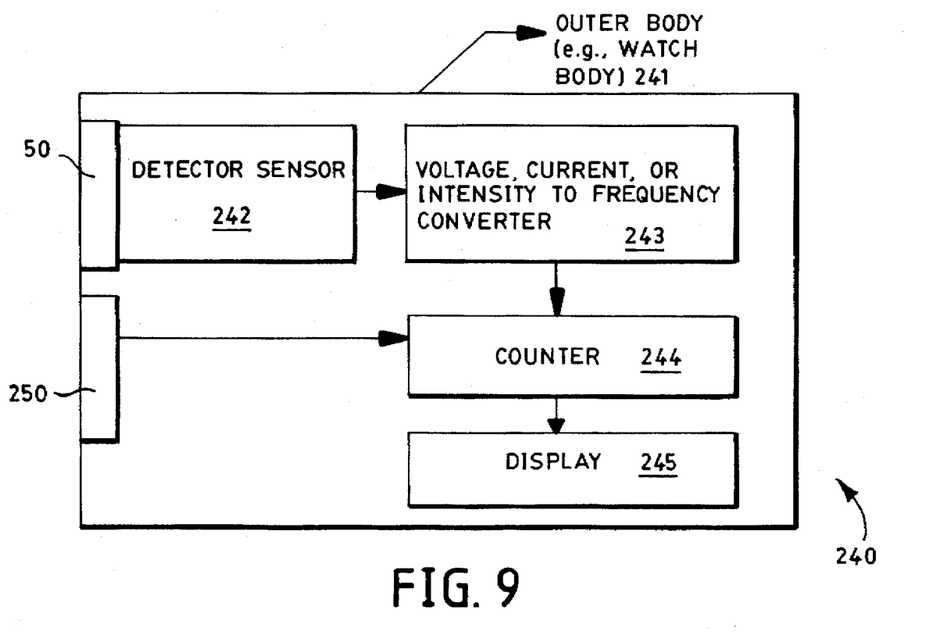
FIG. 9 shows a schematic view of a sun exposure detection system constructed according to the invention, and which includes a solar cell to provide power to system.

FIG. 9 shows a system 240 constructed according to the invention. Preferably, the system 240 is arranged within an outer body 241 such as the watch of FIG. 1A. The system 240 includes many of the elements of FIG. 1, including the detector sensor 242, which is similar to the detector 12. An energy to frequency converter 243 is also similar to the voltage-to-frequency converter 14 of FIG. 1; although those skilled in the art will appreciate that a current to frequency converter or intensity to frequency converter may alternatively be used, depending on the operation of the detector 242. As in FIG. 1, a filter 50 can be used to filter the UV light. A counter 244 counts at the frequency of the output of the element 243, much the way the counter 16 of FIG. 1 operates; and a display 245 provides a visual output of the system 240.

System 240 also includes a solar energy cell 250, which converts solar energy to power, to power the circuit represented by the elements 242, 243, 244 and 245. This removes the need for the battery element 20 of FIG. 1; or it enhances the battery's life, which is still useful to provide power to store digital values during non-illuminated activities.

The invention thus attains the objects set forth above, in addition to those apparent from preceding description. Since certain changes may be made in the above ultraviolet exposure detection apparatus without departing from the scope of the invention, it is intended that all matter contained in the above description or shown in the accompanying drawing be interpreted as illustrative and not in a limiting sense.

It is also to be understood that the following claims are to cover all generic and specific features of the invention described herein, and all statements of the scope of the invention which, as a matter of language, might be the to fall there between.

Having described the invention, what is claimed as new and secured by Letters Patent is:

1. Apparatus for determining the accumulated exposure to ultraviolet radiation, comprising:

detector means for sensing ultraviolet radiation and for producing a signal proportionate to the radiation;

energy-to-frequency converter means for converting the signal to a corresponding frequency;

counter means for counting at the frequency;

wide angle means for providing substantially uniform acceptance to solar energy impinging onto the detector means from different angular directions, the wide angle means having one or more lambertian-like half-spheres formed of solid UV transmitting glass; and indication means for communicating at least an indication of a value counted to by the counter means to a user of the apparatus.

2. Apparatus according to claim 1, further comprising a plurality of UV-transmitting fibers, each of the fibers being constructed and arranged so as to relay energy scattered from within the lambertian half-spheres to the detector means.

3. A method for determining ultraviolet radiation exposure and for communicating that exposure to an individual, comprising the steps of:

sensing ultraviolet radiation in a manner which increases sensitivity to ultraviolet radiation for non-normal solar incidence angles, relative to a UV detector, and for producing a signal proportionate to the radiation, the step of sensing including sensing the radiation through one or more lambertian-like half spheres formed of solid UV-transmitting glass to provide substantially uniform angular acceptance to solar energy impinging on the detector;

converting the signal to a corresponding frequency;

counting at the frequency and converting the frequency to ultraviolet radiation exposure: and communicating the exposure to the individual.

4. A method according to claim 3, further comprising the step of sensing the ultraviolet radiation through a plurality of UV-transmitting fibers, each of the fibers relaying energy scattered from within the half-spheres to the detector.

5. A method for determining ultraviolet radiation exposure and for communicating that exposure to an individual, comprising the steps of:

sensing ultraviolet radiation in a manner which increases sensitivity to ultraviolet radiation for non-normal solar incidence angles, relative to a UV detector, and for producing a signal proportionate to the radiation, the step of sensing including sensing the ultraviolet radiation through a plurality of UV-transmitting fibers, the fibers arranged in an annular pattern to receive solar radiation at differing angles relative to a surface normal of the UV detector;

converting the signal to a corresponding frequency;

counting at the frequency and converting the frequency to ultraviolet radiation exposure; and communicating the exposure to the individual.

6. Apparatus for determining the accumulated exposure to ultraviolet radiation, comprising:

detector means for sensing ultraviolet radiation and for producing a signal proportionate to the radiation;

energy-to-frequency converter means for converting the signal to a corresponding frequency;

counter means for counting at the frequency;

wide angle means for providing substantially uniform acceptance to solar energy impinging onto the detector means from different angular directions, the wide angle means having a plurality of UV-transmitting fibers constructed and arranged into an annular pattern so as to receive solar radiation at differing angles relative to a surface normal of the detector means and such that the fibers do not obstruct a central region within the annular pattern; and indication means for communicating at least an indication of a value counted to by said counter means to a user of the apparatus.

7. Apparatus for determining the accumulated exposure to ultraviolet radiation, comprising:

detector means for sensing ultraviolet radiation and for producing a signal proportionate to the radiation;

energy-to-frequency converter means for converting the signal to a corresponding frequency;

counter means for counting at the frequency;

wide angle means for providing substantially uniform acceptance to solar energy impinging onto the detector means from different angular directions, the wide angle means having (a) four lambertian half spheres constructed and arranged to cover different locations around a watch face and (b) a plurality of UV transmitting fibers connected between each of the spheres and the detector means to communicate UV energy therethrough; and indication means for communicating at least an indication of a value counted to by said counter means to a user of the apparatus.

* * * * *